United States Patent
Bare et al.

(10) Patent No.: US 8,769,135 B2
(45) Date of Patent: Jul. 1, 2014

(54) DATA SET INTEGRITY ASSURANCE WITH REDUCED TRAFFIC

(75) Inventors: Ballard Claude Bare, Auburn, CA (US); Shaun Kazuo Wakumoto, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3290 days.

(21) Appl. No.: 10/981,150

(22) Filed: Nov. 4, 2004

(65) Prior Publication Data

US 2006/0168265 A1     Jul. 27, 2006

(51) Int. Cl.
*G06F 15/16* (2006.01)
*H04L 12/24* (2006.01)

(52) U.S. Cl.
CPC ............................. *H04L 12/2418* (2013.01)
USPC ............ 709/230; 709/231; 709/232; 709/236

(58) Field of Classification Search
USPC .................. 709/230, 231, 232, 236
See application file for complete search history.

(56) References Cited

U.S. PATENT DOCUMENTS

| | | | |
|---|---|---|---|
| 4,729,123 A | | 3/1988 | Wheen |
| 5,646,996 A | * | 7/1997 | Latka ........................... 380/274 |
| 5,978,805 A | * | 11/1999 | Carson ........................... 707/10 |
| 6,075,849 A | * | 6/2000 | Lee et al. ...................... 379/140 |
| 6,192,483 B1 | * | 2/2001 | Moiin et al. ................... 714/4.4 |
| 6,581,074 B1 | | 6/2003 | Wong et al. |
| 7,003,587 B1 | * | 2/2006 | Battat et al. ................... 709/227 |
| 7,009,940 B2 | * | 3/2006 | Vialen et al. .................. 370/252 |
| 7,023,817 B2 | * | 4/2006 | Kuffner et al. ................ 370/324 |
| 7,219,122 B1 | * | 5/2007 | Pena-Mora et al. ........... 709/201 |
| 7,251,570 B2 | * | 7/2007 | Hancock et al. ................ 702/57 |
| 7,283,967 B2 | * | 10/2007 | Nishio et al. .................. 704/500 |
| 2002/0044552 A1 | * | 4/2002 | Vialen et al. .................. 370/389 |
| 2003/0131291 A1 | * | 7/2003 | Morrison et al. .............. 714/54 |
| 2003/0226031 A1 | * | 12/2003 | Proudler et al. .............. 713/200 |
| 2004/0133634 A1 | * | 7/2004 | Luke et al. .................... 709/203 |
| 2005/0138046 A1 | * | 6/2005 | Miettinen et al. ............. 707/100 |
| 2006/0056370 A1 | * | 3/2006 | Hancock et al. .............. 370/338 |

* cited by examiner

*Primary Examiner* — Shaq Taha

(57) ABSTRACT

One embodiment disclosed relates to a method of assuring integrity of a data set between multiple devices. A normalizing factor is generated at a first device. Based on the data set at the first device and the normalizing factor, a first integrity mechanism is calculated. The normalizing factor and the first integrity mechanism are sent from the first device to at least a second device. Other embodiments are also disclosed.

27 Claims, 14 Drawing Sheets

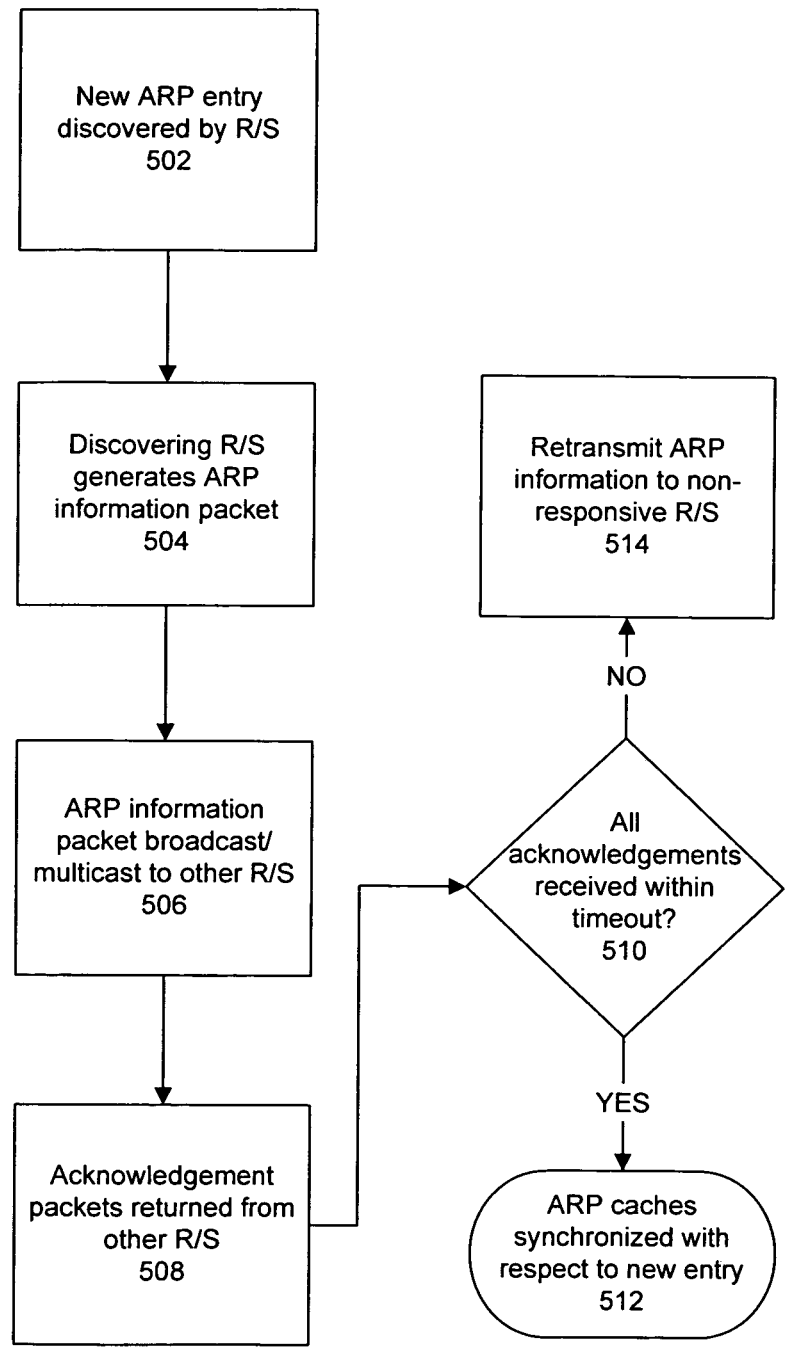
FIG. 5    500

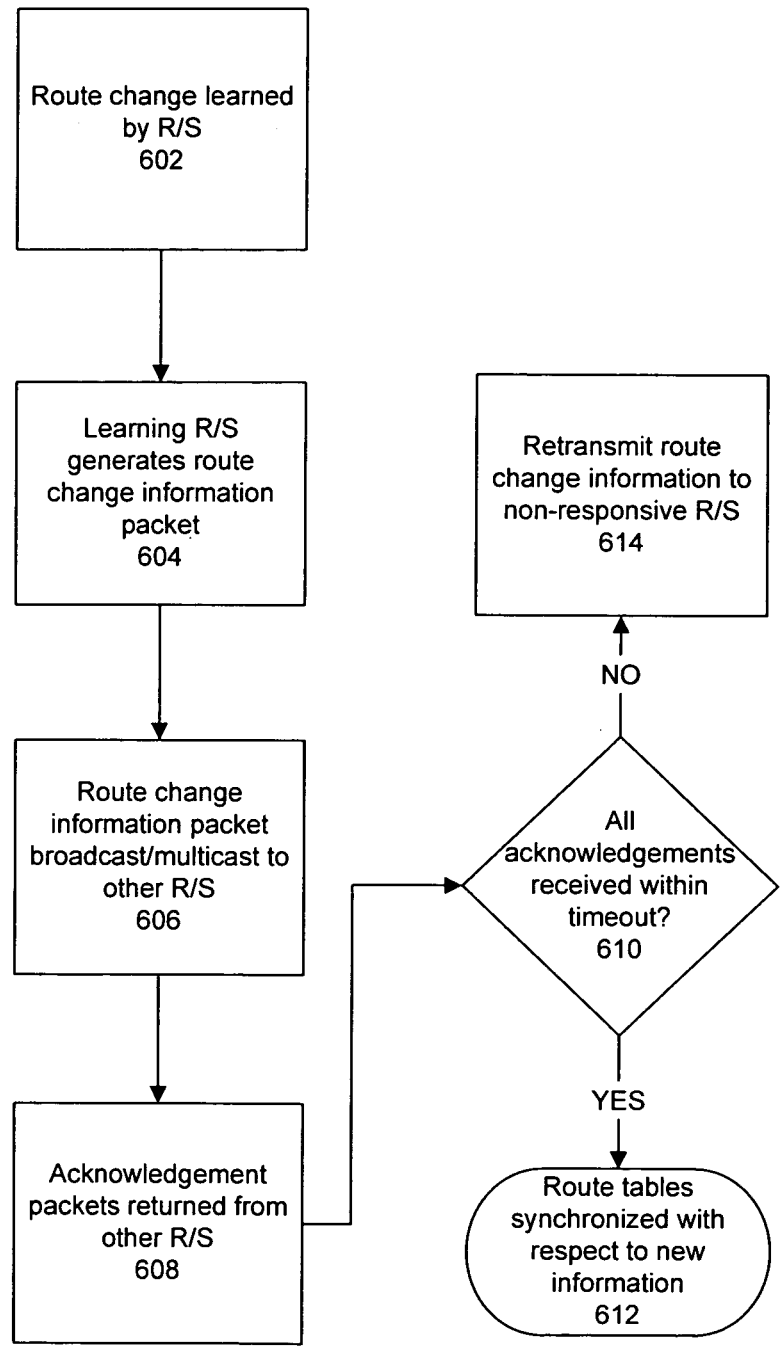
FIG. 6               600

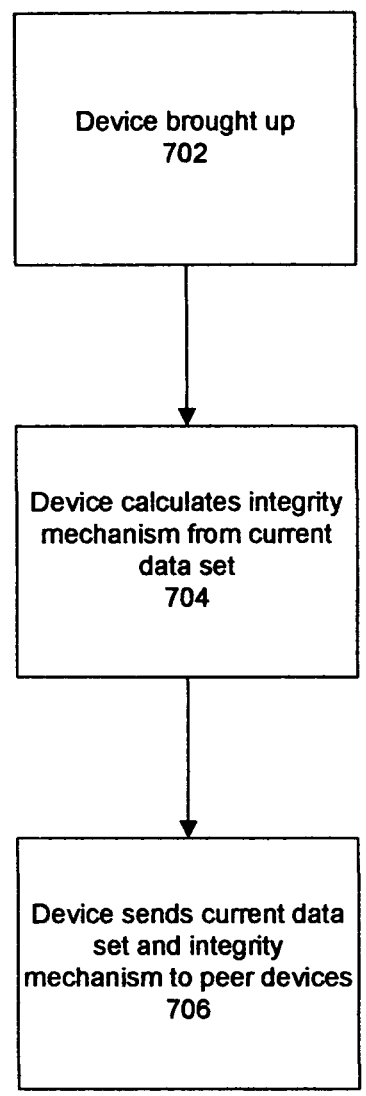
FIG. 7A      700

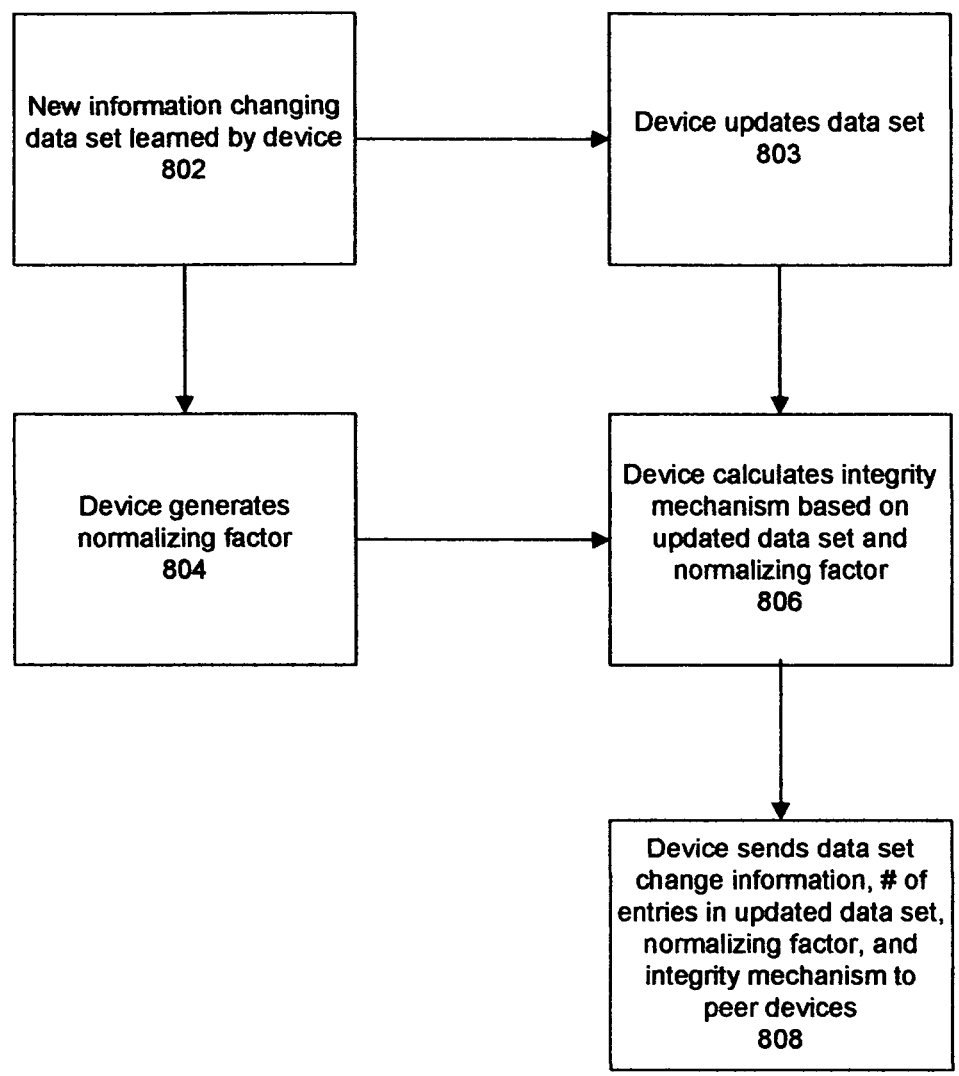
FIG. 8A     800

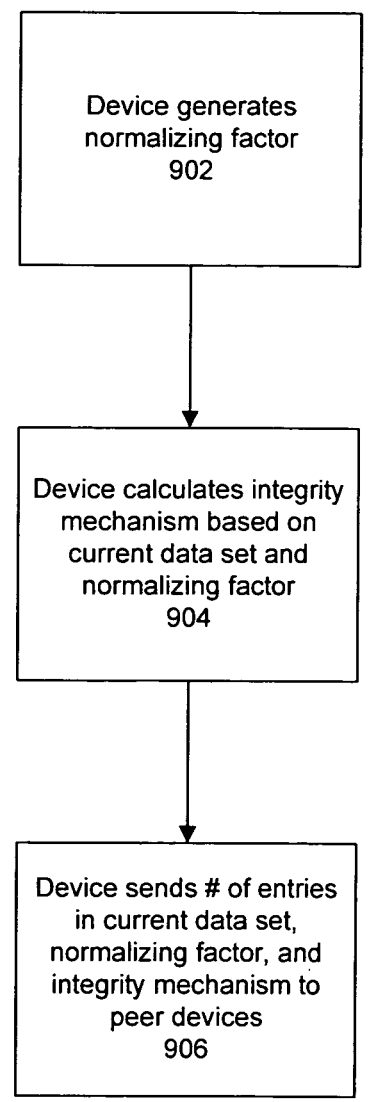
FIG. 9A    900

DATA SET INTEGRITY ASSURANCE WITH REDUCED TRAFFIC

BACKGROUND OF THE INVENTION

1. Field of the Invention

The present invention relates generally to data processing and data communications.

2. Description of the Background Art

In various conventional systems, multiple devices utilize a common set of data that is dynamically changing. Changes in the data set discovered by one of the devices may be broadcast via an update message or packet to the other devices. In addition, to make sure or confirm that the data set is consistent between the devices, the entire set of data is periodically transmitted between the devices. Unfortunately, transmission of the entire set of data can significantly increase the amount of communication traffic during the periodic data synchronizations.

In one conventional example, a routing table may be used by multiple devices in a system. Each of these devices may discover additional or new routing information, and the routing table needs to be updated with this new information. Typically, an update packet may be broadcast from the device discovering the new information to the other devices. In addition, in order to make sure that inconsistencies do not develop and cause problems, the entire routing table may be periodically transmitted between the devices. Routing tables can be very large, such that communication traffic may be increased noticeably when an entire routing table is transmitted across a network.

SUMMARY

One embodiment of the invention relates to a method of assuring integrity of a data set between multiple devices. A normalizing factor is generated at a first device. Based on the data set at the first device and the normalizing factor, a first integrity mechanism is calculated. The normalizing factor and the first integrity mechanism are sent from the first device to at least a second device.

Another embodiment disclosed relates to a method of assuring integrity of a data set after new information changing the data set is learnt at a first device. The data set is updated with the new information at the first device. In addition, a normalizing factor is generated at the first device. The first device then calculates a first integrity mechanism based on the updated data set and the normalizing factor. The new information, the normalizing factor and the first integrity mechanism are sent from the first device to at least a second device.

Other embodiments are also disclosed.

BRIEF DESCRIPTION OF THE DRAWINGS

FIG. 5 is a flow chart depicting a method of propagating ARP information among R/S units in a router aggregation.

FIG. 6 is a flow chart depicting a method of propagating route information among R/S units in a router aggregation.

FIG. 7A is a flow chart depicting a method for a device to send out current information about its data set to peer devices in accordance with an embodiment of the invention.

FIG. 8A is a flow chart depicting a method for a device, upon learning new information changing the data set, to inform peer devices as to the change in accordance with an embodiment of the invention.

FIG. 9A is a flow chart depicting a method that a device may use to periodically assure the integrity of the data set at peer devices in accordance with an embodiment of the invention.

DETAILED DESCRIPTION

The present application discloses a novel technique to assure integrity of a common data set in a way that can substantially reduce periodic communication traffic. Conventional techniques typically transmit a complete data set periodically to make sure that such a data set is consistent across multiple devices. The technique disclosed herein can advantageously assure the integrity of such a data set while avoiding unnecessary periodic transmissions of the entire data set. The technique may be used when updates are made to the data set and also when the data set is in a steady state.

In accordance with one specific embodiment of the invention, the technique may be applied to periodically assure the integrity of routing information between router/switches of a router aggregation. As such, the following section discusses router aggregations.

However, the applications of the technique go beyond use in a router aggregation. For example, a typical routing protocol (for example, the Open Shortest-Path First or OSPF protocol) may periodically transmit a complete routing table between routers to make sure the tables are consistent. This technique may be applied to greatly reduce the amount of traffic required by such protocols. In other embodiments, the technique may be applied to periodically assure integrity of a different data set that is used and maintained by other devices.

Router Aggregations

Router aggregations are discussed in U.S. patent application Ser. No. 10/919,760, entitled "Method and Apparatus for Router Aggregation," filed Aug. 17, 2004 by inventors Ballard C. Bare and Shaun K. Wakamoto, ("the router aggregation application"), the disclosure of which is hereby incorporated by reference in its entirety. As disclosed in the router aggregation application, multiple router/switches may be aggregated to advantageously form a "router aggregation" or an "aggregated" router.

In comparison to a single large router, an aggregated router can provide more robust up-time and security and can be spread across a larger geographic area. While loss of a single large router would result in losing functioning of all the many routing ports on that large router, loss of one of the aggregated router/switches would result in losing functioning of only those ports connected to that router/switch, while the remainder of the aggregated router/switches still function. Furthermore, an aggregation of router/switches provides greater scalability and may be typically less expensive than a single large router.

In comparison to smaller routers connected via routing protocols, an "aggregated" router can substantially reduce routing overhead. The router look-up may be performed once at the edge of the aggregated router topology and then the packet may be efficiently switched using layer 2 switching techniques after that. The layer 2 switching is more efficient than layer 3 routing because the layer 2 switching is less complex and requires less overhead.

Figure 1:
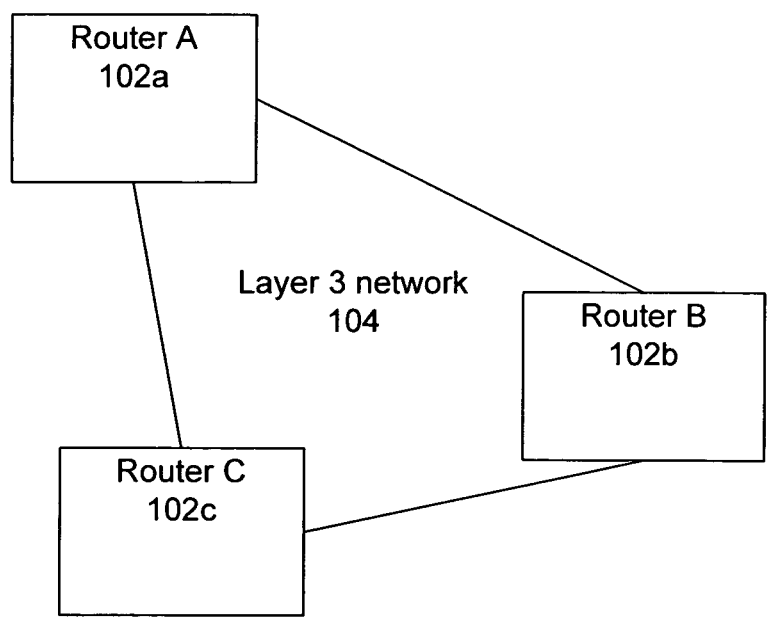
FIG. 1 is a schematic diagram depicting a conventional configuration where multiple routers interconnected via routing protocols.

FIG. 1 is a schematic diagram depicting a conventional configuration 100 where multiple routers interconnected via routing protocols. In the example illustrated, three routers 102 are interconnected by way of a layer 3 network 104. In other words, the routers 102 utilize layer 3 routing protocols to communicate data packets between each other.

Figure 2:
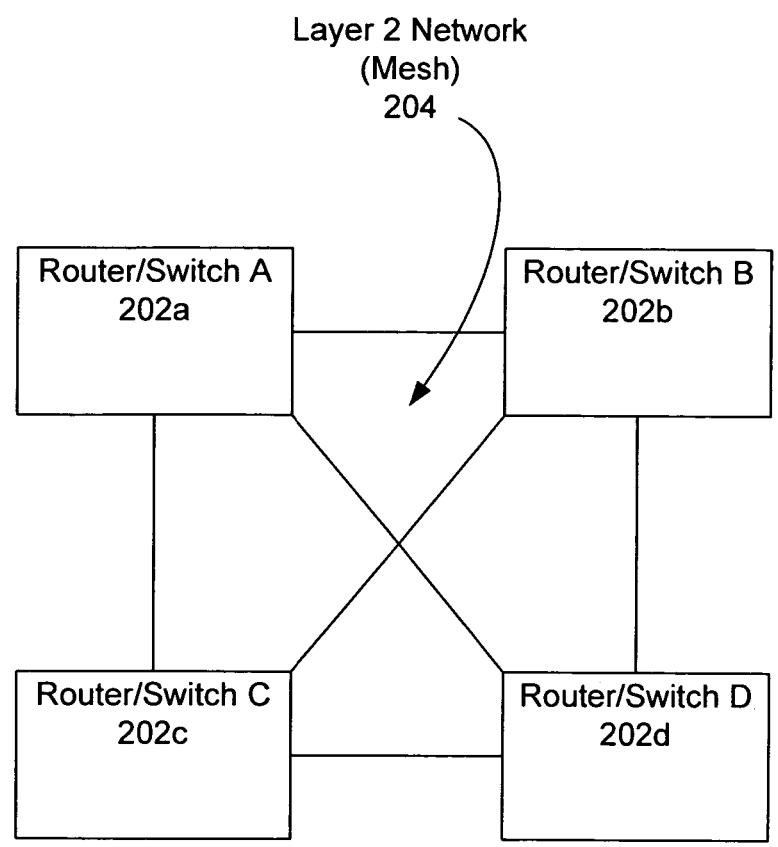
FIG. 2 is a schematic diagram depicting an example "router aggregation" including multiple router/switches.

FIG. 2 is a schematic diagram depicting an exemplary "router aggregation" 200. In the router aggregation, multiple router/switches 202 are interconnected with a layer 2 network 204 and configured in such a way so as to appear as one larger router. The exemplary router aggregation depicted shows four router/switches 202, but a router aggregation 200 may include more or less than that number. As more router bandwidth and/or more router ports are needed, more router/switches 202 may be added to the router aggregation 200.

The layer 2 network 204 interconnecting the router/switches 202 of the router aggregation 200 is utilized by the router/switches 202 to share information required to keep each other informed of routing-related connections external to the router aggregation 200. In one particular embodiment, the layer 2 network 204 comprises a switch mesh. Such a switch mesh may be implemented, for example, using protocols such as those described in U.S. Pat. No. 6,580,715 ("Load Balancing Switch Protocols," inventor Ballard C. Bare) or using similar protocols. In alternate embodiments, a non-mesh layer 2 topology may also be used (for example, one utilizing the spanning tree protocol or a form thereof), but meshing has advantages with respect to load balancing and lowest latency path aspects. Regarding the use of a spanning tree protocol, single-instance spanning tree allows only a single path through the topology and so may restrict bandwidth to an extent where it may not be an appropriate lower layer to use for aggregated routing. However, multi-instance spanning tree in an appropriate configuration may be viable for aggregated routing since it allows multiple alternate paths.

Figure 3A:
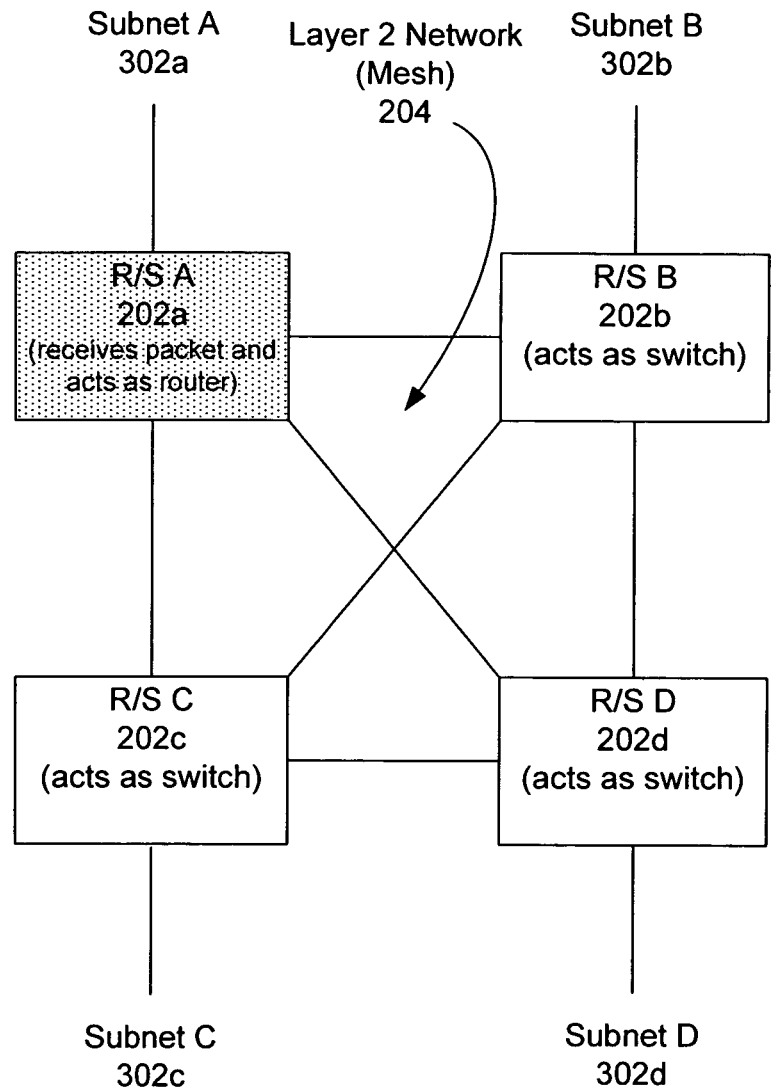
FIG. 3A is a schematic diagram depicting the functionality of the example router aggregation when a packet is initially received by router/switch (R/S) A.
Figure 3B:
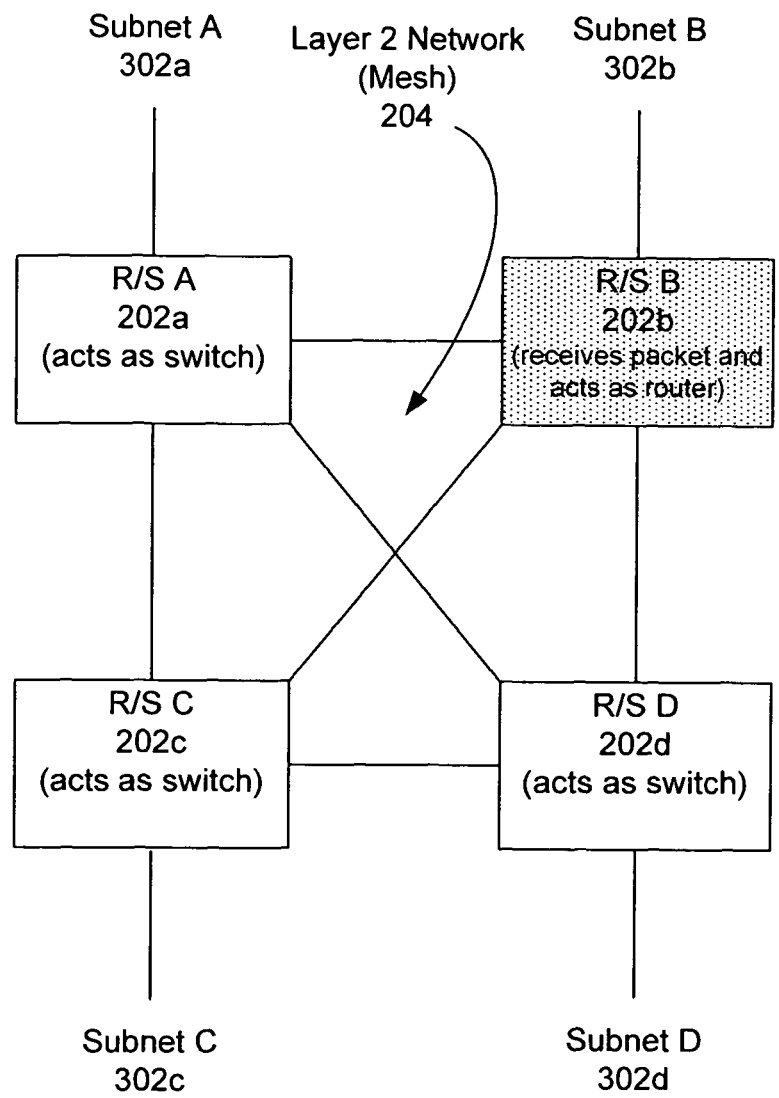
FIG. 3B is a schematic diagram depicting the functionality of the example router aggregation when a packet is initially received by R/S B.
Figure 4:
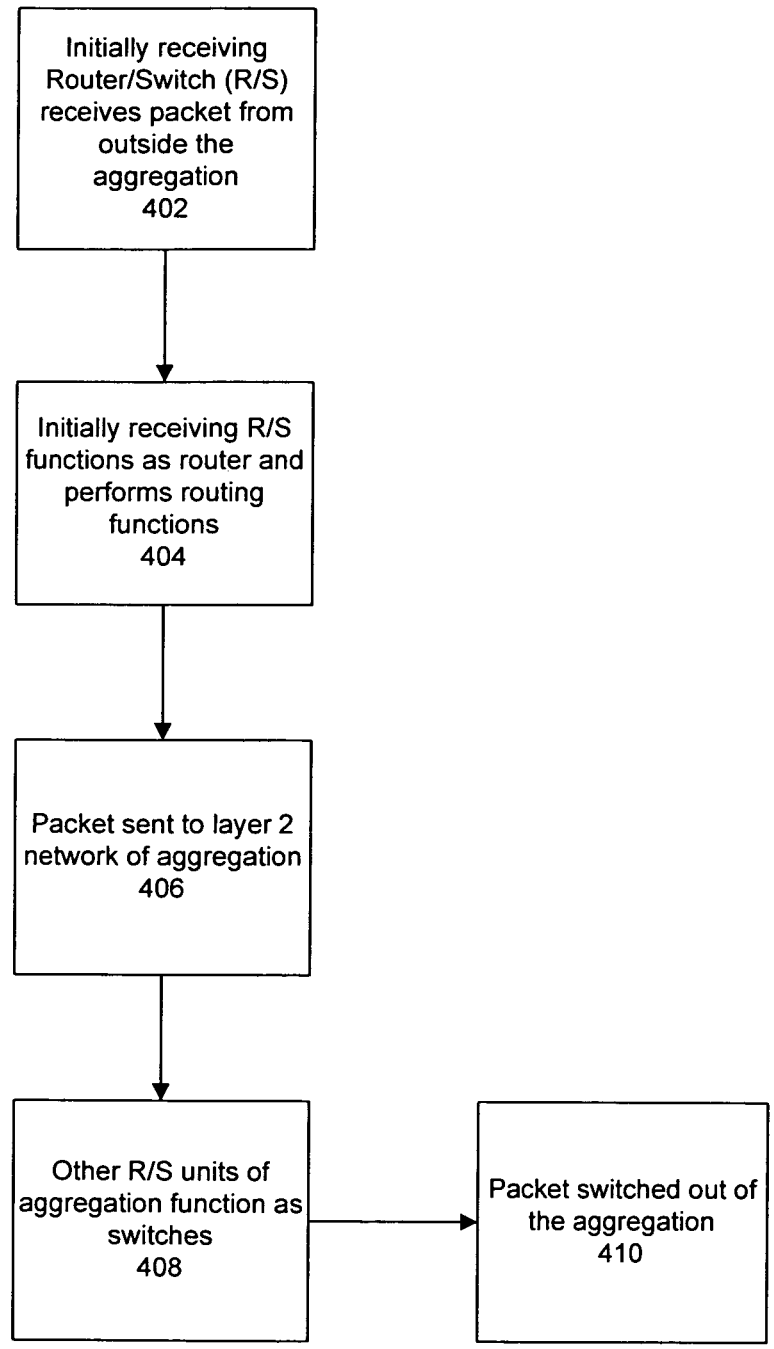
FIG. 4 is a flow chart depicting a method of routing by a router aggregation.

The functionality and operation of a router aggregation is now discussed in relation to FIGS. 3A, 3B, and 4. FIG. 4 is a flow chart depicting a method 400 of routing by a router aggregation. FIG. 3A is a schematic diagram depicting the functionality of the example router aggregation 200 when a packet is initially received into the aggregation by router/switch (R/S) A 202a. FIG. 3B is a schematic diagram depicting the functionality of the example router aggregation 200 when a packet is initially received by R/S B 202b. In FIGS. 3A and 3B, each R/S unit 202 is shown with external links that go to different subnets 302.

First, consider the case where a packet is initially received into the aggregation by router/switch (R/S) A 202a, as shown in FIG. 3A. In this case, the R/S A 202a initially receives (402) a packet into the aggregation 200 from subnet A 302a. As the initially receiving router, R/S A 202a performs (404) the routing functions, including looking "deeper" into the packet for the destination IP address, looking-up the destination IP address in its routing table, checking any IP access control lists (ACLs), modifying the source and destination MAC addresses, decrementing IP time-to-live (TTL), and re-computing the IP header checksum, then forwarding the packet as necessary. Advantageously, these routing functions need be performed only once. When necessary, the initially receiving router, R/S A 202a forwards the packet by sending (406) the packet to the layer 2 network 204 of the aggregation 200. When the packet is received by one or more of the other R/S units (B, C, and D) 202, these other R/S units 202 merely function (408) as layer 2 switches and switches (410) the packet out of the aggregation 200 to the appropriate subnet(s) 302 using layer 2 switching techniques.

Similarly, consider the case where a packet is initially received into the aggregation by router/switch (R/S) B 202b, as illustrated in FIG. 3B. In this case, the R/S B 202b initially receives (402) a packet into the aggregation 200 from subnet B 302b. As the initially receiving router, R/S B 202b performs (404) the routing functions, including looking "deeper" into the packet for the destination IP address, looking-up the destination IP address in its routing table, checking any IP access control lists (ACLs), modifying the source and destination MAC addresses, decrementing IP time-to-live (TTL), and re-computing the IP header checksum, then forwarding the packet as necessary. Advantageously, these routing functions need be performed only once. When necessary, the initially receiving router, R/S B 202b forwards the packet by sending (406) the packet to the layer 2 network 204 of the aggregation 200. When the packet is received by one or more of the other R/S units (A, C, and D) 202, these other R/S units 202 merely function (408) as layer 2 switches and switches (410) the packet out of the aggregation 200 to the appropriate subnet(s) 302 using layer 2 switching techniques.

The router aggregation 200 would operate in an analogous manner if the initially receiving router was R/S C 202c or R/S D 202d. In each case, only the initially receiving router/switch 202 needs to perform routing functions. The other units 202 act as switches to forward the packet.

The above-discussed operation of the router aggregation 200 advantageously reduces the overhead and increases the performance relative to a group of routers interconnected via routing protocols. From each aggregated router's point of view, the layer 2 network (mesh) 204 is a direct connection to all of the subnets 302 that are directly connected to all its peer routers 202 in the aggregation 200.

To make router aggregation easy for a user to configure, the aggregated router 200 may be configured to appear as one large router from an external point of view. The may be implemented using a network management function that can see the entire network. Management Information Base (MIB) parameters would be included in the routers to allow the network management to discover which routers are interconnected so as to form a router aggregation 200.

In order to implement the router aggregation, at least two additional protocols may be used. One additional protocol comprises a protocol to distribute ARP information amongst the R/S units 202 of the router aggregation 200. Another additional protocol comprises a protocol to distribute routing information amongst the R/S units 202 of the router aggregation 200.

The ARP cache information is passed between the aggregated routers so that when a packet needs to be routed through the aggregation, the receiving router will know what MAC address to put as the destination into the routing packet. (If path tags are utilized, as discussed further below, then the information should also include the appropriate tag to add to the packets routed to that destination.) This MAC address could be an end host that is directly connected to any of the aggregated routers or a next hop router that is externally connected to the aggregation.

The sharing of routing information is done so that the router knows if one of the aggregated routers is directly connected to the destination subnet or if the packet must be sent to an externally connected subnet. This then determines whether a host lookup or a next hop lookup is performed in the ARP cache.

If the destination subnet is directly connected to the router aggregation and no ARP cache entry exists for the destination, then the router that needs the information (the initially receiving router) may request the address resolution information from the appropriate edge router based on the routing table information. This router in turn may either send the address resolution information if it knows the information, or it may issue an ARP request to gather the information. The ARP response is then used to provide the appropriate destination MAC address for forwarding the packet.

FIG. 5 is a flow chart depicting a method 500 of propagating address resolution protocol (ARP) information among R/S units 202 in a router aggregation 200. When a new ARP entry is discovered (502) by any of the aggregated routers 202, the discovering router/switch propagates this information to its peers.

In one embodiment, the discovering router/switch generates (504) an ARP information packet and sends (506) that packet to the other aggregated routers so that they would enter the ARP information into their ARP caches. The ARP information packet may be preferably sent (506) by way of broadcasting or multicasting to reduce overhead. However, to ensure success, each receiving router/switch would be configured to return (unicast) (508) acknowledgement packets to the sending router/switch. If the sending router/switch receives (510) all the acknowledgements within a timeout period, then the ARP caches of the routers in the aggregation would be synchronized (512) with respect to the new entry. Otherwise, if all acknowledgements are not received within the timeout period, then the sending router/switch may retransmit (514) the ARP information individually to those router/switches that had not responded.

In addition, an aggregated router may be advantageously configured to only age out ARP entries for which it is the owner. When an aggregated router does age out an ARP entry, it should inform its peers (the other aggregated routers) that the entry is aged out. If a given edge router of the aggregate is lost (i.e. removed from the aggregate), the other aggregated router may then remove all the ARP cache entries associated with the removed router. In this manner, the ARP caches in all the aggregated routers may remain synchronized. To further assure synchronization, a periodic packet may be sent with all the ARP cache information. In the case when a router first comes up as part of the router aggregate, that new router may request a complete update from one or more of the other aggregated routers.

Note that if the layer 2 network 204 comprises a switch mesh, as in a preferred embodiment, then the router may already know the MAC addresses of its peers and could use this knowledge to determine from which routers it should expect acknowledgements. However, this information could be configured or discovered with other protocols if meshing was not utilized.

FIG. 6 is a flow chart depicting a method of propagating route information among R/S units 202 in a router aggregation 200. When a router/switch 202 at an edge of the router aggregate 200 learns (602) about a route change for its non-aggregate connected interfaces to external subnets, the learning R/S not only updates its own routing tables, but also propagates this information to its peers. Route changes may come in the form of OSPF information, or links changing state, or routes aging, and so on.

In accordance with one embodiment, in order to propagate the route change information, the learning R/S generates (604) a route change information packet and sends (606) that packet to the other aggregated routers so that they can update their routing tables. The route change information packet may be preferably sent (606) by way of broadcasting or multicasting to reduce overhead. However, to ensure success, each receiving router would be configured to return (unicast) (608) acknowledgement packets to the sending router/switch. If the sending router receives (610) all the acknowledgements within a timeout period, then the routing tables of the routers in the aggregation would be synchronized (612) with respect to the route change information. Otherwise, if all acknowledgement are not received within the timeout period, then the sending router may retransmit (614) the route change information individually to those router/switches that had not responded.

Note from each aggregated router's point of view, the layer 2 network of the aggregate appears as a directly connecting interface to all the connected subnets of its peers (i.e. of the other aggregated routers), except the only way those routes change is based on route change information packets from the peers. This routing information would be propagated outside the router aggregate using which ever routing protocols are configured for the non-aggregate ports.

Data Set Integrity Assurance

We now discuss in detail the assurance of the integrity of data sets with reduced periodic traffic in accordance with embodiments of the invention. In one embodiment, the devices may comprise router/switches of a router aggregation, and the data set may comprise the routing table used and maintained by the router/switches, as discussed above. In other embodiments, the technique may be applied to periodically assure integrity of a different data set that is used and maintained by other devices. For example, the data set may comprise an address resolution protocol (ARP) table, or a media access control (MAC) address table, or other similar tables that need to be consistent among multiple devices.

FIG. 7A is a flow chart depicting a method 700 for a device to send out current information about its data set to peer devices in accordance with an embodiment of the invention. When the device is brought up (702), the device calculates (704) an integrity mechanism based on the current data set at the device. The device then sends (706) the current data set and the corresponding integrity mechanism to peer devices. In one implementation, the information may be sent by way of a broadcast mechanism to all the pertinent peer devices.

For example, in the router aggregation embodiment, when a router/switch is brought up (702), the router/switch may calculate (704) a checksum based on its current routing table. The router/switch may then send (706) the current routing table and the corresponding checksum to other router/switches in the router aggregation. In one implementation, the information may be sent by way of a broadcast mechanism to all the pertinent peer devices.

Figure 7B:
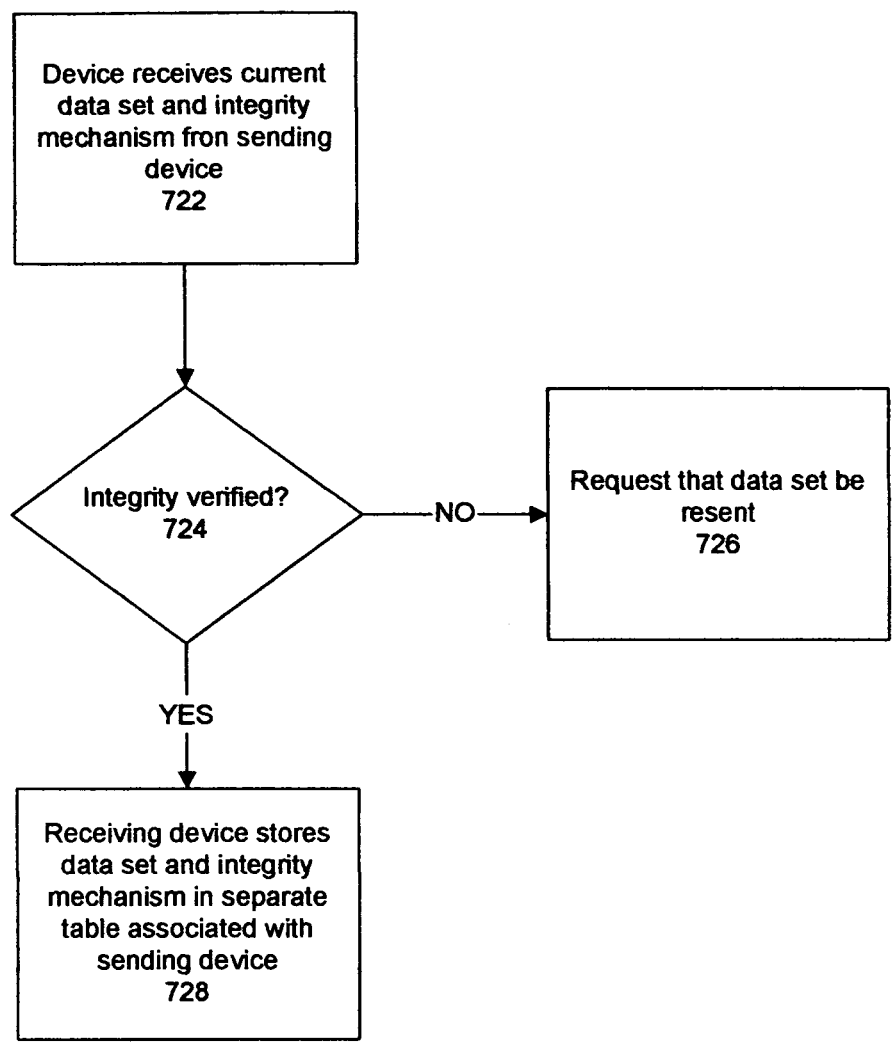
FIG. 7B is a flow chart depicting a method for a peer device receiving the current data set and integrity mechanism from another device in accordance with an embodiment of the invention.

FIG. 7B is a flow chart depicting a method 720 for a peer device receiving the current data set and integrity mechanism from another device in accordance with an embodiment of the invention. When the peer device receives (722) the current data set and integrity mechanism from the sending device, the receiving device uses the integrity mechanism to verify (724) the integrity of the data set received. If the data set is found not to have integrity, then the receiving device may send a request (726) to the sending device that the data set be resent. If the integrity of the data set is verified, then the receiving device stores (728) the data set and integrity mechanism in a separate table associated with the sending device.

For example, in the router aggregation embodiment, when a router/switch receives (722) a current routing table and corresponding checksum from another router/switch of the router aggregation, the receiving router/switch calculates a checksum on the received table and compares it with the received checksum to verify (724) the integrity of the table received. If the table is found not to have integrity, then the receiving router/switch may send a request (726) to the sending router/switch that the table be re-sent. In one implementation, the sending router/switch may reply to such a request by a unicast, including the complete routing table, to the requesting router/switch. If the integrity of the table is verified, then stores (728) the received routing table and its checksum in a separate layer 3 routing aggregation table 740 associated with the sending router/switch.

Figure 7C:
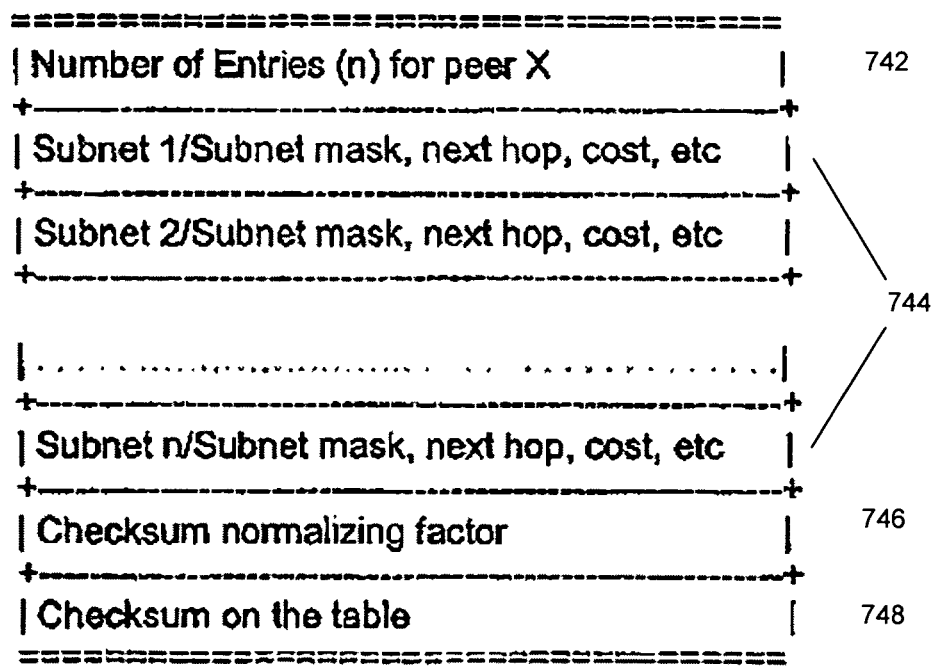
FIG. 7C depicts an exemplary layer 3 routing aggregation table.

An exemplary layer 3 routing aggregation table 740 is shown in FIG. 7C. The table includes a number of entries for the sending peer device 742, the entries for the routing table 744, a checksum "normalizing factor" 746 (discussed further below), and a checksum 748 based on the routing table.

FIG. 8A is a flow chart depicting a method 800 for a device, upon learning new information changing the data set, to inform peer devices as to the change in accordance with an embodiment of the invention.

When the device learns (802) such new information, the learning device updates (803) the data set and generates (804) a "normalizing factor." The normalizing factor comprises a factor (a number or data) that is used to force or ensure that a calculated integrity mechanism is different or distinct from a previous calculated integrity mechanism. Preferably, the normalizing factor would be generated so as to make the calculated value of the integrity mechanism different over many (for example, a thousand) updates, even if the data is the same. In one implementation, the normalizing factor may be generating by incrementing the previous factor, and then verifying that the resultant integrity value is different from the previous integrity value or values. If the resultant integrity value is not different, then the factor may be further incremented until the resultant integrity value is different. In another implementation, for some integrity mechanisms, an integrity result that is different may be chosen (for example, by incrementing the previous integrity result by a small random amount), and the corresponding normalizing factor may then be calculated. For example, applicants believe that this latter implementation may be performed in software for a checksum mechanism, or performed in hardware for a CRC mechanism.

The device then calculates (806) an integrity mechanism based on the data set after updating plus the normalizing factor. The device then sends (808) the data set change information, the number of entries in the updated data set, the normalizing factor, and the calculated integrity mechanism to peer devices.

For example, in the router aggregation embodiment, when a router/switch learns (802) new routing information, the learning device updates (803) the routing table and generates (804) a "normalizing factor." The switch/router then calculates (806) a checksum based on the routing table after updating plus the normalizing factor. The device then sends (808) the routing table change information, the number of entries in the updated routing table, the normalizing factor, and the calculated integrity mechanism to peer devices. The information sent is advantageously much smaller than a complete routing table. In one implementation, the information may be sent by way of a broadcast mechanism to all the pertinent peer devices.

Figure 8B:
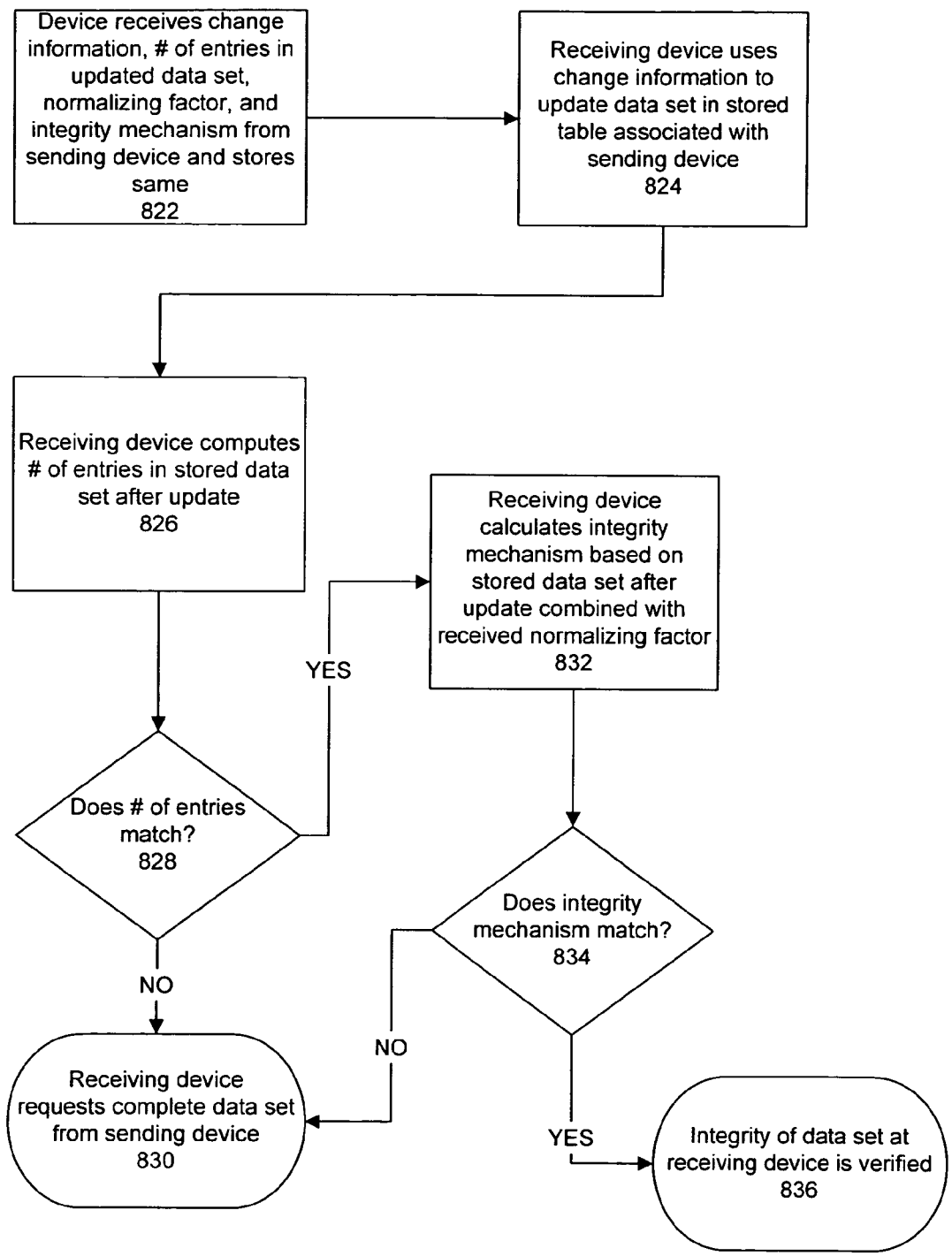
FIG. 8B is a flow chart depicting a method for a peer device receiving change-related information to process the information while verifying the integrity of the data set in accordance with an embodiment of the invention.

FIG. 8B is a flow chart depicting a method 820 for a peer device receiving change-related information to process the information while verifying the integrity of the data set in accordance with an embodiment of the invention. The peer device receives (822) the data set change information, the number of entries in the updated data set, the normalizing factor, and the integrity mechanism from the sending device and stores that information. The receiving device uses the change information to update (824) the data set in the stored table associated with the sending device.

The receiving device computes (826) the number of entries in the stored data set after the update. This computed number of entries is compared (828) with the number of entries that was received to see if the two numbers match. If the numbers of entries do not match, then there is an integrity problem with the data set, so the receiving device sends a request (830) for the complete data set to the sending device.

If the numbers of entries do match, then the receiving device calculates (832) the integrity mechanism based on the stored data set after the update combined with the received normalization factor. This calculated integrity mechanism is compared (834) with the integrity mechanism received to see if they match. If the integrity mechanisms do not match, then there is an integrity problem with the data set, so the receiving device sends a request (830) for the complete data set to the sending device.

If the integrity mechanisms do match, then the integrity of the data set at the receiving device is verified (836). Advantageously, this technique provides assurance of the integrity of the data set without unnecessary transmission of the complete data set.

For example, in the router aggregation embodiment, the router/switch receives (822) the routing table change information, the number of entries in the updated routing table, the normalizing factor, and the checksum from the sending device and stores that information. The receiving device uses the change information to update (824) the layer 3 routing aggregation table 740 associated with the sending device.

The receiving router/switch computes (826) the number of entries in the routing table after the update. This computed number of entries is compared (828) with the number of entries that was received to see if the two numbers match. If the numbers of entries do not match, then there is an integrity problem with the routing table, so the receiving router/switch sends a request (830) for the complete routing table to the sending router/switch. In one implementation, the sending router/switch may reply to such a request by a unicast, including the complete routing table, to the requesting router/switch.

If the numbers of entries do match, then the receiving router/switch calculates (832) the checksum based on the stored routing table after the update combined with the received normalization factor. This calculated checksum is compared (834) with the checksum that was received to see if they match. If the checksums do not match, then there is an integrity problem with the routing table, so the receiving router/switch sends a request (830) for the complete routing table to the sending router/switch.

If the checksums do match, then the integrity of the routing table at the receiving router/switch is verified (836). Advantageously, this technique provides assurance of the integrity of the routing table without unnecessary transmission of the complete routing table.

FIG. 9A is a flow chart depicting a method 900 that a device may use to periodically assure the integrity of the data set at peer devices in accordance with an embodiment of the invention. In an exemplary embodiment, this method 900 may be applied after no updates to the data set have occurred for a period of time.

When it is desired to assure the integrity of the data set at peer devices, the device generates (902) a "normalizing factor." As discussed above, the normalizing factor is used to force or ensure that a calculated integrity mechanism is different or distinct from the preceding calculated integrity mechanism. The device then calculates (904) an integrity mechanism based on the current data set plus the normalizing factor. The device then sends (906) the number of entries in the current data set, the normalizing factor, and the calculated integrity mechanism to peer devices.

For example, in the router aggregation embodiment, when it is desired to assure the integrity of the routing table at peer devices, the router/switch generates (902) a "normalizing factor." The router/switch then calculates (904) a checksum based on the current routing table plus the normalizing factor. The router/switch then sends (906) the number of entries in the current routing table, the normalizing factor, and the calculated checksum to peer devices. The information sent is advantageously much smaller than a complete routing table. In one implementation, the information may be sent by way of a broadcast mechanism to all the pertinent peer devices.

Figure 9B:
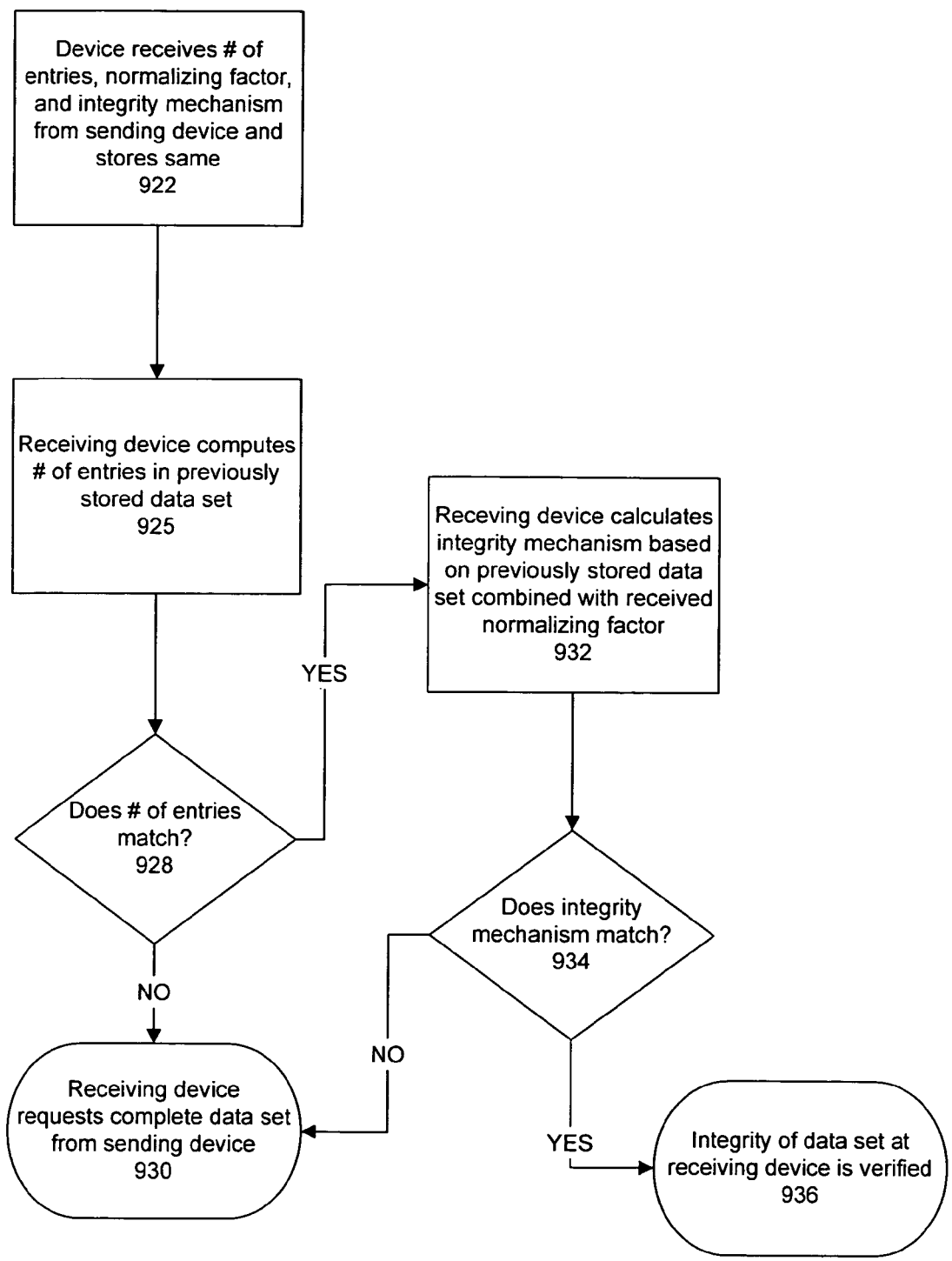
FIG. 9B is a flow chart depicting a method for a peer device receiving the integrity-assurance information to use the information to verify integrity of the data set in accordance with an embodiment of the invention.

FIG. 9B is a flow chart depicting a method for a peer device receiving the integrity-assurance information to use the information to verify integrity of the data set in accordance with an embodiment of the invention. The peer device receives (922) the number of entries, the normalizing factor, and the integrity mechanism from the sending device and stores that information.

The receiving device computes (925) the number of entries in the previously stored data set. This computed number of entries is compared (928) with the number of entries that was received to see if the two numbers match. If the numbers of entries do not match, then there is an integrity problem with the previously stored data set, so the receiving device sends a request (930) for the complete data set to the sending device.

If the numbers of entries do match, then the receiving device calculates (932) the integrity mechanism based on the previously stored data set combined with the received normalization factor. This calculated integrity mechanism is compared (934) with the integrity mechanism received to see if they match. If the integrity mechanisms do not match, then there is an integrity problem with the previously stored data set, so the receiving device sends a request (930) for the complete data set to the sending device.

If the integrity mechanisms do match, then the integrity of the data set at the receiving device is verified (936). Advantageously, this technique provides assurance of the integrity of the data set without unnecessary transmission of the complete data set.

For example, in the router aggregation embodiment, the router/switch receives (922) the number of entries, the normalizing factor, and the checksum from the sending router/switch and stores that information.

The receiving router/switch computes (925) the number of entries in the previously stored routing table. This computed number of entries is compared (928) with the number of entries that was received to see if the two numbers match. If the numbers of entries do not match, then there is an integrity problem with the previously stored routing table, so the receiving router/switch sends a request (930) for the complete data set to the sending router/switch. In one implementation, the sending router/switch may reply to such a request by a unicast, including the complete routing table, to the requesting router/switch.

If the numbers of entries do match, then the receiving router/switch calculates (932) the checksum based on the previously stored routing table combined with the received normalization factor. This calculated checksum is compared (934) with the checksum received to see if they match. If the checksums do not match, then there is an integrity problem with the previously stored routing table, so the receiving router/switch sends a request (930) for the complete routing table to the sending router/switch.

If the checksums do match, then the integrity of the previously stored routing table at the receiving router/switch is verified (936). Advantageously, this technique provides assurance of the integrity of the routing table without unnecessary transmission of the complete routing table.

Note that, in the above discussion, an integrity mechanism is utilized in assuring the integrity of a data set. One example of an integrity mechanism is a checksum. Other integrity mechanisms may also be used. As another example, the integrity mechanism may comprise a cyclical redundancy check (CRC). As yet another example, the integrity mechanism may comprise a message digest. A message-digest algorithm may be configured to take as input a message of arbitrary length and produce as output a number (of a certain number of bits) that serves as a "fingerprint" or "message digest" of the input.

Note also that, depending on the data integrity algorithm used, the data may or may not need to be kept in the same order at the various peer devices. Typically, integrity mechanisms that require the data to be kept in the same order provides for a more robust integrity verification.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of assuring integrity of a data set between multiple devices, the method comprising:
generating a normalizing factor at a first device;
calculating a first integrity mechanism based on the data set at the first device and the normalizing factor; and
sending the normalizing factor and the first integrity mechanism from the first device to at least a second device,
wherein the first device is a source device of the data set whose integrity is being assured, and the second device is a destination device of the data set whose integrity is being assured.

2. The method of claim 1, further comprising:
receiving the normalizing factor and the first integrity mechanism at the second device;
calculating a second integrity mechanism based on the data set at the second device and the normalizing factor;
comparing the first and second integrity mechanisms.

3. The method of claim 2, further comprising:
sending a request for a complete data set from the second device to the first device if the first and second integrity mechanisms do not match.

4. The method of claim 1, further comprising:
computing a first number of entries from the data set at the first device; and
sending the first number of entries, in addition to the normalizing factor and the first integrity mechanism, from the first device to the second device.

5. The method of claim 4, further comprising:
receiving the first number of entries, the normalizing factor, and the first integrity mechanism at the second device; and
computing a second number of entries from the data set at the second device;
comparing the first and second numbers of entries;
calculating a second integrity mechanism based on the data set at the second device and the normalizing factor; and
comparing the first and second integrity mechanisms.

6. The method of claim 1, wherein the integrity mechanism includes a checksum.

7. The method of claim 1, wherein the normalizing factor is generated such that the first integrity mechanism is ensured to be different from a previously sent integrity mechanism, even if the data set is unchanged.

8. The method of claim 7, wherein the normalizing factor is generated by providing a distinct integrity mechanism, then determining the normalizing factor corresponding to the distinct integrity mechanism.

9. The method of claim 7, wherein the normalizing factor is generated by providing a candidate normalizing factor, then verifying that the candidate normalizing factor results in a distinct integrity mechanism.

10. A method of assuring integrity of a data set between multiple devices, the method comprising:
learning new information changing the data set at a first device;
updating the data set with the new information at the first device;
generating a normalizing factor at the first device;
calculating a first integrity mechanism at the first device based on the updated data set and the normalizing factor;
sending the new information, the normalizing factor and the first integrity mechanism from the first device to at least a second device.

11. The method of claim 10, further comprising:
receiving the new information, the normalizing factor, and the first integrity mechanism at the second device;
updating the data set at the second device with the new information;
calculating a second integrity mechanism at the second device based on the updated data set and the normalizing factor;
comparing the first and second integrity mechanisms.

12. The method of claim 11, further comprising:
sending a request for a complete data set from the second device to the first device if the first and second integrity mechanisms do not match.

13. The method of claim 10, further comprising:
computing a first number of entries from the updated data set at the first device; and
sending the first number of entries from the first device to the second device.

14. The method of claim 13, further comprising:
receiving the new information, the first number of entries, the normalizing factor, and the first integrity mechanism at the second device; and
updating the data set at the second device with the new information;
computing a second number of entries from the updated data set at the second device;
comparing the first and second numbers of entries;
calculating a second integrity mechanism based on the data set at the second device and the normalizing factor; and
comparing the first and second integrity mechanisms.

15. The method of claim 14, further comprising:
sending a request for a complete data set from the second device to the first device if either the first and second numbers of entries do not match, or the first and second integrity mechanisms do not match.

16. The method of claim 10, wherein the integrity mechanism includes a checksum.

17. The method of claim 10, wherein the normalizing factor is generated such that the first integrity mechanism is ensured to be different from a previously sent integrity mechanism, even if the data set is unchanged.

18. The method of claim 17, wherein the normalizing factor is generated by providing a distinct integrity mechanism, then determining the normalizing factor corresponding to the distinct integrity mechanism.

19. The method of claim 17, wherein the normalizing factor is generated by providing a candidate normalizing factor, then verifying that the candidate normalizing factor results in a distinct integrity mechanism.

20. An apparatus configured to maintain integrity of a data set between the apparatus and peer devices, the apparatus comprising:
a processor configured to execute processor-executable code;
communication connections to the peer devices;
processor-executable code configured to create a normalizing factor;
processor-executable code configured to compute a first integrity value based on the data set at the apparatus and the normalizing factor; and
processor-executable code configured to transmit the normalizing factor and the first integrity value from the apparatus to at least one peer device,
wherein the apparatus is a source device of the data set whose integrity is being assured, and the at least one peer device is a destination device of the data set whose integrity is being assured.

21. The apparatus of claim 20, further comprising:

processor-executable code configured to determine a first number of entries from the data set at the apparatus; and processor-executable code configured to transmit the first number of entries, in addition to the normalizing factor and the first integrity value, from the apparatus to the peer device(s).

22. An apparatus configured to maintain integrity of a data set between the apparatus and peer devices, the apparatus comprising:

a processor configured to execute processor-executable code;

communication connections to the peer devices;

processor-executable code configured to receive a data update pertinent to the data set at the apparatus and to update the data set at the apparatus with the data update;

processor-executable code configured to create a normalizing factor;

processor-executable code configured to compute a first integrity value based on the data set at the apparatus and the normalizing factor; and processor-executable code configured to transmit the data update, the normalizing factor, and the first integrity value from the apparatus to at least one peer device, wherein the apparatus is a source device of the data set whose integrity is being assured, and the at least one peer device is a destination device of the data set whose integrity is being assured.

23. The apparatus of claim 22, further comprising:

processor-executable code configured to determine a first number of entries from the updated data set at the apparatus; and processor-executable code configured to transmit the first number of entries from the apparatus to the peer device(s).

24. The method of claim 1, wherein the generating the normalizing factor comprises generating the normalizing factor which is configured to ensure that the calculating of the first integrity mechanism calculates the first integrity mechanism which is different from a previous integrity mechanism which was calculated using the data set.

25. The method of claim 1, wherein the generating the normalizing factor comprises generating the normalizing factor which is configured to ensure that the calculating of the first integrity mechanism calculates the first integrity mechanism which is different from all previous integrity mechanisms which were calculated using the data set.

26. The method of claim 1, wherein the generating the normalizing factor comprises generating the normalizing factor which is configured to ensure that the calculating of the first integrity mechanism calculates the first integrity mechanism which is different from all previous integrity mechanisms which were calculated using the data set even if the data set used for the calculations of all of the first and previous integrity mechanisms is the same.

27. The apparatus of claim 22, wherein the processor-executable code configured to compute the first integrity value comprises code configured to compute the first integrity value based on the updated data set.

\* \* \* \* \*